US00RE37185E

(19) United States
(12) Reissued Patent
Satoh et al.

(10) Patent Number: US RE37,185 E
(45) Date of Reissued Patent: May 22, 2001

(54) OPTICAL HEAD

(75) Inventors: Isao Satoh, Neyagawa; Sadao Mizumo, Ibaraki; Noboru Itoh, Hirakata, all of (JP)

(73) Assignee: Matsushita Electric Industrial Co., Ltd.

(21) Appl. No.: 08/891,058

(22) Filed: Jul. 10, 1997

Related U.S. Patent Documents

Reissue of:
(64) Patent No.: 5,148,421
Issued: Sep. 15, 1992
Appl. No.: 07/685,409
Filed: Apr. 16, 1991

U.S. Applications:

(63) Continuation of application No. 08/306,065, filed on Sep. 14, 1994, now abandoned.

(30) Foreign Application Priority Data

Apr. 20, 1990 (JP) ..... 2-106157
Nov. 27, 1990 (JP) ..... 2-328715

(51) Int. Cl.[7] ..... G11B 7/095
(52) U.S. Cl. ..... 369/44.23; 369/94; 369/275.3; 369/286
(58) Field of Search ..... 369/44.11, 44.14, 369/44.23–44.24, 44.27, 93–95, 112, 275.3, 283.286

(56) References Cited

U.S. PATENT DOCUMENTS

| | | | | |
|---|---|---|---|---|
| 4,230,939 | | 10/1980 | de Bont et al. . | |
| 4,353,767 | | 10/1982 | Wilkinson . | |
| 4,432,002 | | 2/1984 | Ando . | |
| 4,450,452 | | 5/1984 | Ando et al. . | |
| 4,561,086 | * | 12/1985 | Geyer | 369/100 |
| 4,712,207 | * | 12/1987 | Reno | 369/121 |
| 4,800,112 | | 1/1989 | Kano et al. . | |
| 4,837,758 | * | 6/1989 | Motoyama et al. | 369/13 |
| 4,892,606 | * | 1/1990 | Miyazaki et al. | 369/286 |
| 4,959,824 | * | 9/1990 | Ueda et al. | 369/44.14 |
| 4,977,019 | | 12/1990 | Schaefer . | |
| 5,533,001 | | 7/1996 | Watanabe et al. | 369/275.2 |

FOREIGN PATENT DOCUMENTS

| | | | |
|---|---|---|---|
| 3203599 | | 8/1982 | (DE) . |
| 0128960 | | 12/1984 | (EP) . |
| 0144436 | * | 6/1985 | (EP) . |
| 245953 | | 11/1987 | (EP) . |
| 0268352 | | 5/1988 | (EP) . |
| 0288570 | | 11/1988 | (EP) . |
| 339368 | | 11/1989 | (EP) . |
| 0439100 | * | 7/1991 | (EP) . |
| 0473785 | | 3/1992 | (EP) . |
| 56-148749 | | 11/1981 | (JP) . |
| 57-172544 | | 10/1982 | (JP) . |
| 59-15913 | | 1/1984 | (JP) . |
| 60-243834 | * | 12/1985 | (JP) . |
| 62-66433 | * | 3/1987 | (JP) . |
| 62-167636 | | 7/1987 | (JP) . |
| 62-264456 | | 11/1987 | (JP) . |
| 63-96745 | * | 4/1988 | (JP) . |

(List continued on next page.)

OTHER PUBLICATIONS

"Optical Disc Technology,"pp. 60–65, Feb. 10, 1989.

*Primary Examiner*—W. R. Young
(74) *Attorney, Agent, or Firm*—Weil Gotshal & Manges LLP

(57) ABSTRACT

In an optical disc recording-reproducing apparatus using a standard optical disc enclosed in a cartridge, and optical plate for correcting various aberrations generated by a focusing lens is comprised therein in order to allow use of a double recording optical disc enclosed in the standard cartridge of the same size, the optical plate is placed in front of a focusing lens when the double recording optical disc is used, and is removed from the front of the focusing lens when the standard optical disc is used.

19 Claims, 3 Drawing Sheets

FOREIGN PATENT DOCUMENTS

| | | |
|---|---|---|
| 63-268145 | 11/1988 | (JP) . |
| 1-224941 | 9/1989 | (JP) . |
| 1-251376 | 10/1989 | (JP) . |
| 1-267856 | 10/1989 | (JP) . |
| 2-05245 | 1/1990 | (JP) . |
| 88/06337 | 8/1988 | (WO) . |

* cited by examiner

OPTICAL HEAD

Matter enclosed in heavy brackets [ ] appears in the original patent but forms no part of this reissue specification; matter printed in italics indicates the additions made by reissue.

*This application is a continuation of application Ser. No. 08/306/065, filed on Sep. 14, 1994, now abandoned, which is a Reissue of application Ser. No. 07/685,409, filed on Apr. 16, 1991, U.S. Pat. No. 5,148,421.*

FIELD OF THE INVENTION

The present invention relates generally to an optical head of an optical disc recording-reproducing apparatus for recording and reproducing information to an optical disc, and more particularly to a convertible optical head which is applicable to both the standard optical disc and a nonstandard optical disc.

DESCRIPTION OF THE RELATED ART

A rewritable optical disc such as a magneto-optical disc is standardized by the "Draft Proposal DP10090 of ISO Standard". According to the standard of the Draft Proposal, the rewritable optical disc is 86 mm in diameter and has a recording area on one surface of a transparent polycarbonate substrate of 1.2 mm thick. Moreover, a protection layer of 0.2 mm thick at the most is placed on the recording area, and thus entire thickness is 1.4 mm at the most. In a magneto-optical disc according to the standard, a magnetic device is arranged to generate a magnetic field in immediate proximity to the recording area. A recording capacity of the above-mentioned standard optical disc is 128 MB, for example. The rewritable optical disc in the prior art mentioned above has the recording area on only one side of the optical disc, and hence significant increase of the recording capacity has been impossible. In order to significantly increase the recording capacity, an optical disc having the recording area on both sides of a substrate is devised, and hence a convertible optical head must be developed to be applicable to both the standard optical disc and the optical disc having the recording area on both the sides of the substrate.

OBJECT AND SUMMARY OF THE INVENTION

An object of the present invention is to provide an optical head of an optical disc recording-reproducing apparatus which can use an optical disc having a recording area on one side of a substrate in accordance with the draft proposal DP10090 of ISO standard or an optical disc having recording areas on both sides of a substrate in order to increase recording capacity.

The optical head in accordance with the present invention comprises:

- laser light emitting means for emitting laser light,
- collimating means for collimating the laser light emitted by the laser light emitting means,
- focusing means for focusing the laser light collimated by the collimating means on a recording area of an optical disc,
- a beam splitter for separating laser light reflected from the recording area of the optical disc,
- laser light sensing means for detecting laser light separated by the beam splitter,
- at least one optical plate for correcting aberration of the focusing means, and

- actuator means for positioning the optical plate between the optical disc and the focusing means or for removing the optical plate therefrom.

While the novel features of the invention are set forth particularly in the appended claims, the invention, both as to organization and content, will be better understood and appreciated, along with other objects and features there, from the following detailed description taken in conjunction with the drawings.

It will be recognized that some or all of the FIGURES are schematic representations for purposes of illustration and do not necessarily depict the actual relative sizes or locations of the elements shown.

DESCRIPTION OF THE PREFERRED EMBODIMENTS

Figure 1:
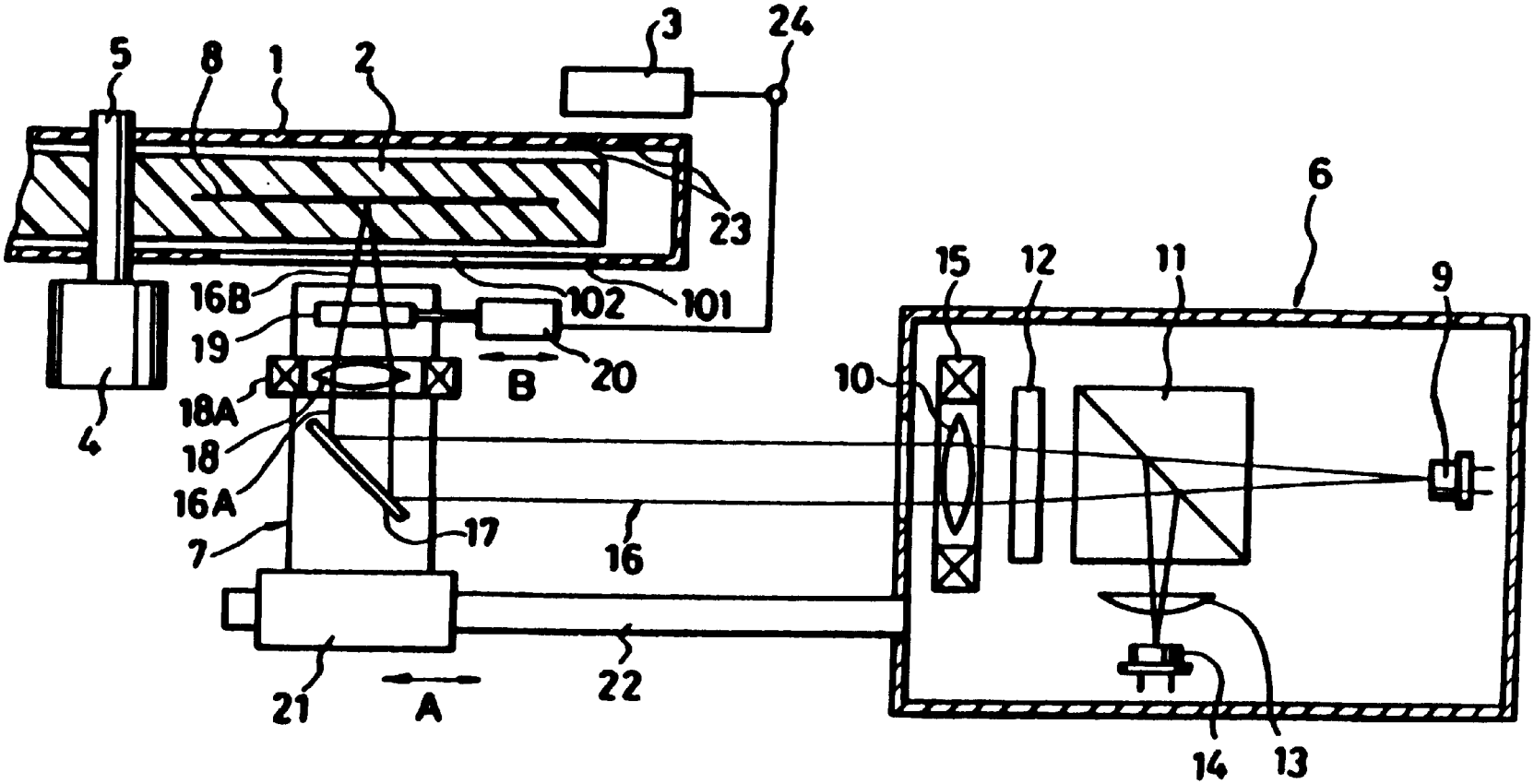
FIG. 1 is a side view of an optical disc recording-reproducing apparatus of an embodiment in accordance with the present invention.

FIG. 1 is a side view of an optical head of an embodiment in accordance with the present invention. Referring to FIG. 1, an optical disc 2 is enclosed in a cartridge 1 having an aperture 101 covered by a transparent member 102 on the lower face thereof to allow passing of laser light. The cartridge 1 is set to a driving apparatus comprising a driving motor 4, and the optical disc 2 is rotated by a shaft 5 of the driving motor 4. The cartridge 1 has identification pits (or holes) 23 on the circumferential part thereof. The identification pits 23 are sensed by a detector 3 comprising a light source and a light sensing device, and a kind of cartridge is identified by the position of the identification pits 23. The detected output of the detector 3 is output on a terminal 24.

An optical head comprising a stationary optical part 6 and a moving optical part 7 is placed under the cartridge 1. The stationary optical part 6 comprises a laser light emitting device 9 for emitting a laser light and an opto-electronic device 14. The laser light emitted from the laser light emitting device 9 is passed through a beam splitter 11, a $\lambda/4$-optical plate 12 and a collimator lens 10, and a collimated laser beam 16 is emitted from the stationary optical part 6.

A moving optical part 7 is movably held by a guide rail 22 secured to the stationary optical part 6, and is moved along the guide rail 22 by a linear driving motor 21 mounted on the moving optical part 7 in a direction shown by arrow A. The moving optical part 7 comprises a reflection mirror 17 for directing the laser beam 16 upward in FIG. 1, a focusing lens 18 for focusing the laser beam 16A reflected by the reflection mirror 17 on a recording area 8 of the optical disc on which information is recorded and an optical plate 19 for correcting aberration of the laser beam 16B focused by the focusing lens 18.

The focusing lens 18 is moved in the direction of the optical axis thereof by a focusing lens drive means 18A.

The optical plate 19 is shifted by a shift mechanism 20 in a direction shown by arrow B, so that the optical plate 19 is positioned in front of the focusing lens 18 or is removed therefrom.

"Focusing" and "tracking" of the laser beam 16B to a predetermined track of the optical disc 2 are performed by moving the collimator lens 10 in the stationary optical part 6, which is moved by an actuator 15 in the stationary optical part 6.

Laser light reflected by the recording surface 8 of the optical disc 2 is applied to the reflection mirror 17 through the focusing lens 18, and is directed to the collimator lens 10 of the stationary optical part 6. In the stationary optical part 6, the reflected laser light is directed to the opto-electronic device 14 by the beam splitter 11.

Figure 2:
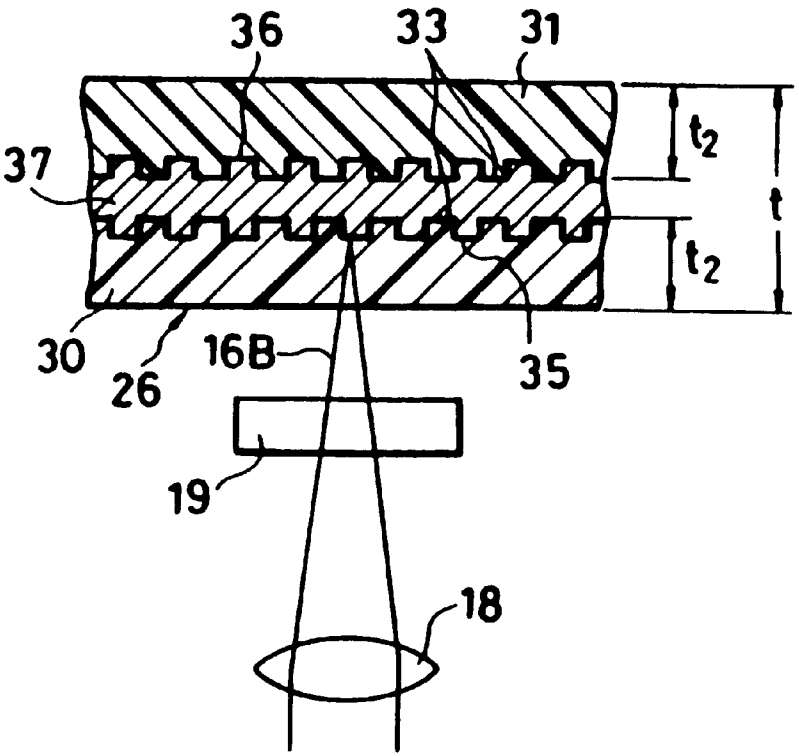
FIG. 2(a) is a cross-section of an optical disc according to the draft proposal DP10090 of ISO standard.
FIG. 2(b) is a cross-section of an optical disc having recording areas on both sides of the optical disc.
Figure 2:
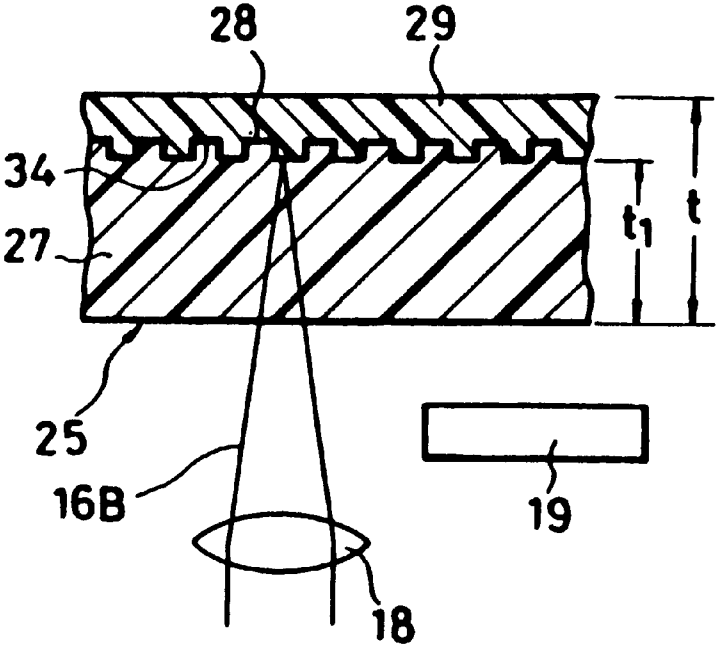

FIGS. 2(a) and 2(b) are cross-sections of the standard optical disc 25 and a "double recording optical disc" 26 having the recording area on both sides of the substrate of the optical disc, respectively.

Referring to FIG. 2(a), a spiral track 28 or a plurality of tracks 28 of concentric circles are formed on a surface of a substrate 27 made of transparent material such as polycarbonate plastics or glass. According to the Draft Proposed DP10090 as ISO Standard, the substrate 27 is 1.2 mm thick (t1) and the entire thickness (t) is 1.4 mm. A recording layer 34 is plated on the face having the tracks 28, and further the recording layer 34 is covered with a protection layer 29 for protecting the recording layer 34 and tracks 28. Recording-reproducing operation of the optical disc 25 is performed by applying a laser beam 16B for the moving optical part 7 to the surface of the substrate 27.

Referring to FIG. 2(b), tracks 35 are formed on a surface of a first substrate 30 in a similar manner of the standard optical disc 25. On the other hand, tracks 36 are formed on a surface of a second substrate 31 in a similar manner of the first substrate 30. Then, a recording layer 33 for recording information by variation of status of crystallization is plated on both the tracks 35 and 36. Subsequently, the first substrate 30 is adhered with the second substrate 31 by suitable adhesive substance 37 in a manner that the surface having the tracks 35 of the substrate 30 faces to the surface having the tracks 36 of the second substrate 31. Both the substrates 30 and 31 are 0.6 mm thick (t2) and the adhesive substance 37 is made to 0.2 mm thick, and consequently, the entire thickness is 1.4 mm.

The focusing lens 18 is adequately designed in a manner that various aberrations are minimized with respect to the standard optical disc 25 having the substrate of 1.2 thick. Therefore, in the double recording optical disc 26 shown in FIG. 2(b), since the thickness t2 of the first substrate 30 is 0.6 mm, which is thinner than that of the substrate 27 of the standard optical disc 25, the various aberrations increases. In order to correct the various aberrations in the double recording optical disc 26, an optical plate 19 made of a flat-plate optical member is inserted between the focusing lens 18 and the double recording optical disc 26. The laser beam 16B focused by the focusing lens 18 is applied to the double recording optical disc 26 through the optical plate 19. Consequently, the double recording optical disc 26 and the standard optical disc 25 are compatibly usable in the same optical disc recording-reproducing apparatus by insertion or removing of the optical plate 19. In the double recording optical disc 26, the distance between the focusing lens 18 and the recording area 35 must be kept on the same value as that in the standard optical disc 25 to focus the laser light 16B on the recording area 34 which is nearer than the recording area 35 of the standard optical disc 25 to the focusing lens 18. The shift of the focusing lens 18 is performed by the focusing lens drive means 18A (shown in FIG. 1).

The thickness t3 of the optical plate 19 is given by $$t3=(n1*t1-n2*-t)/n3 \quad (1),$$

where, n1: refractive index of substrate 27, n2: refractive index of substrate 30, n3: refractive index of optical plate 19, t1: thickness of substrate 27, t2: thickness of substrate 30.

For example, it is assumed that refractive indexes n1, n2 and n3 are 1.5, and the thickness t1 is 1.2 mm and the thickness t2 is 0.6 mm, the thickness t3 is 0.6 mm.

Moving operation of the optical plate 19 is determined by detection of the identification pits 23 of the cartridge 1. Though one optical plate 19 is illustrated in FIGS. 2(a) and 2(b), a plurality of optical plates 19 having a variety of thicknesses may be mounted on a revolving holder to allow use of a variety of optical discs.

Recording operation of the standard optical disc 25 is elucidated hereafter for a magneto-optical disc. The direction of magnetization of the recording layer 34 is oriented into a predetermined direction by erasing operation in advance. Subsequently, a laser beam of which the diameter of the cross-section is 1 $\mu$m of smaller is applied to a predetermined position of the recording layer 34. The intensity of the laser beam 16B is selected to heat the recording layer 34 to the Curie temperature or higher. Then biasing magnetic field is applied to the recording layer 34 by a magnetic field generating means (not shown) in concurrence with temperature rise of the recording layer 34, and thereby the direction of magnetization of the recording layer 34 is turned over. Namely, the recording of the information is performed by change of the direction of magnetization.

In the above-mentioned operation, the intensity of the laser beam is controlled by the input current of the laser light generating device 9.

In reproducing operation of the information recorded as mentioned above, a laser beam 16B of which the intensity is lower than that of the recording operation is applied to the recording layer 34, and a variation of a plane of polarization of the reflected laser light is detected. The plane of polarization is varied by Kerr effect in compliance with the direction of magnetization.

The recording-reproducing operation by means of the phase-change of crystallization in the recording layer 34 is elucidated hereafter. A laser beam 16B having a predetermined intensity is applied to the recording layer 34, and which is transferred to amorphous state or crystal state. For instance, in recording operation, the laser beam having a first intensity which is relatively large is applied to a predetermined part of the recording layer 34 to record information, and thus the recording layer 34 is heated to a temperature which is higher than the melting point of the recording layer 34. Then the part of the recording layer 34 is rapidly cooled by sudden extinction of the laser beam 16B. Consequently, the part of the recording layer 34 transfers to amorphous state, and thereby the information is recorded.

In erasing operation of the information, the part of the recording layer 34 is heated to a temperature which is lower than the melting point by a laser beam 16B having a second intensity which is lower than that of the first intensity. Consequently, the part transfers to crystallized state which represents erased status of the recording layer 34.

Erasing operation and recording operation can be performed simultaneously at the same part of the recording layer 34 by applying the first intensity of the laser beam. The above-mentioned operation is named "direct overwrite".

In reproducing operation of the information recorded by the above-mentioned operation, a laser beam of a third intensity which is lower than the second intensity used in the erasing operation is used, and the information is reproduced in a manner that is familiar to one skilled in the art.

In reproducing operation of the double recording optical disc 26 shown in FIG. 2(b), a side of the optical disc which is used presently for in recording-reproducing operation is faced to the moving optical part 7 and is set to the shaft 5 of the driving motor 4. The recording-reproducing operation is similar to that of the standard optical disc 25 shown in FIG. 2(a).

In general, the recording density D of the optical disc is given by $$D=(NA/\lambda)^2 \quad (2),$$

where,

NA: numerical aperture, $\lambda$: wavelength of the laser light.

In the equation (2), the wavelength $\lambda$ of the laser light must be reduced or the numerical aperture NA of the focusing lens 18 must be increase din order to increase the recording density D. The reduction of the wavelength $\lambda$ of the laser light depends on the status of research and development of the laser light emitting device in the present technology of electronics. Therefore, the increase of the numerical number NA of the focusing lens must be considered in order to increase the recording density D. However, the increase of the numerical aperture NA is limited by the thickness of the substrate 27 or 30 of the optical disc or by increase by "Coma aberration" and "Astigmatism" which are caused by tilt of the optical disc set on the driving motor 4 of the optical disc recording-reproducing apparatus.

In the event that the tilt angle of the optical disc is relatively small, for example 0.2 degree, Coma aberration mainly increases. Owing to the increase of the Coma aberration, the intensity of the laser beam 16B in recording operation is reduced, crosstalk is increased and C-N ratio is decreased in reproducing operation.

In order to maintain the reduction of the intensity of the laser beam within several per cent in 0.2 degree of the tilt angle of the optical disc, the numerical aperture NA must be selected to 0.5–0.55.

Figure 3:
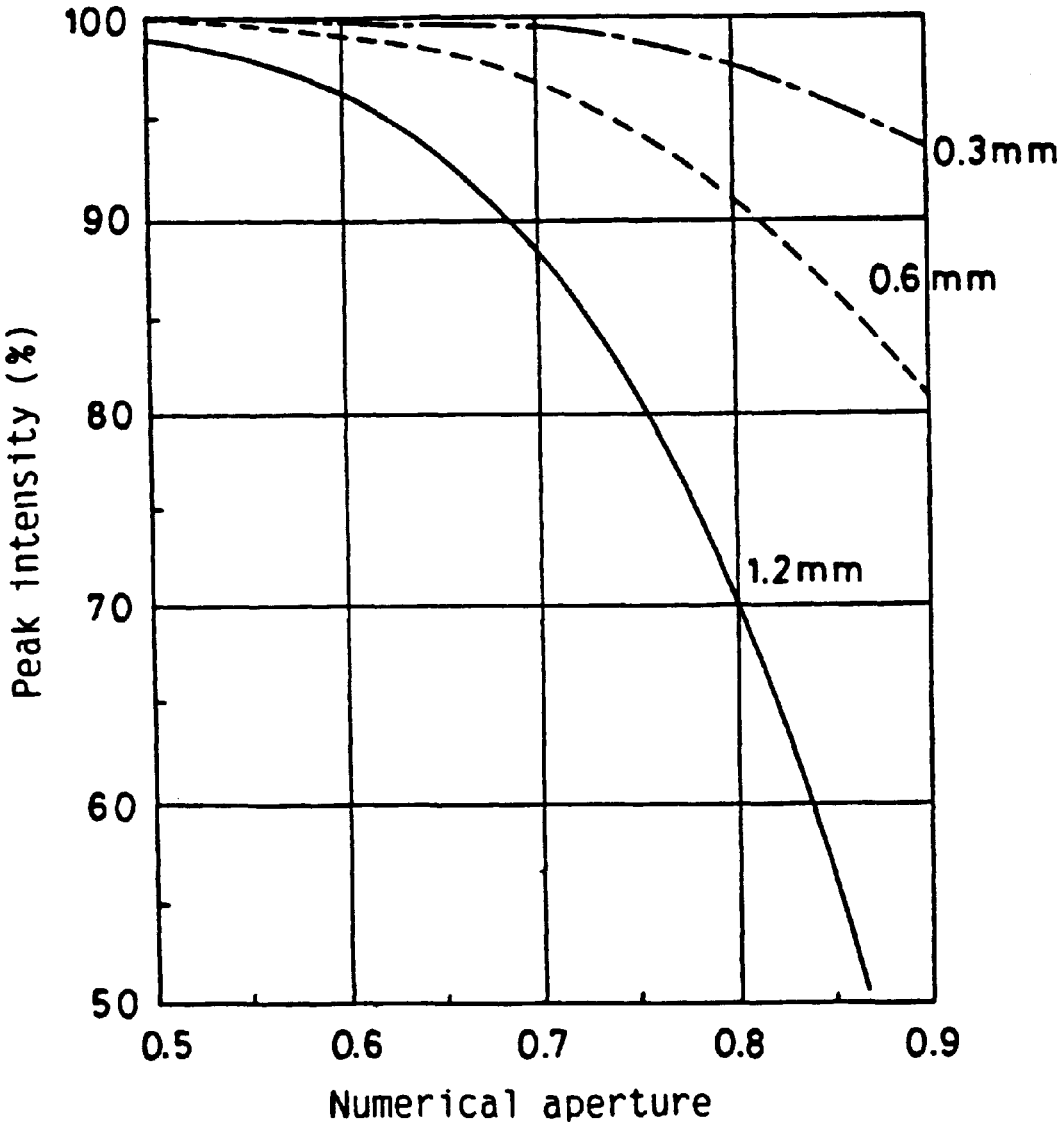
FIG. 3 is a graph of a relation between a numerical aperture and a peak intensity ratio of a laser beam.

FIG. 3 is a graph of relation between a numerical aperture NA and a "peak intensity" of the laser beam. The peak intensity represents an intensity of the laser light at a part having a maximum intensity in the cross-section of the laser beam focused on the recording layer 34. In the graph, abscissa is graduated by the numerical aperture NA, and ordinate is graduated by the peak intensity. The tilt angle of the optical disc is 0.2 degree, the refractive index of the substrate is 1.5, and the thickness t1 of the substrate of the optical disc is 1.2 mm, 0.6 mm or 0.3 mm. The graph is obtained by the calculation of "diffraction integration" according to "Kilchhoff's diffraction theory", and detailed description of the calculation is omitted.

Referring to FIG. 3, when the thickness t1 is 1.2 mm and the numerical aperture NA is 0.5, the peak intensity is reduced to 99%. On the other hand, when the numerical aperture NA is 0.65, the thickness t1 must be 0.6 mm and below in order to maintain 99% of peak intensity. Furthermore, when the numerical aperture NA is 0.75, the thickness t1 must be 0.3 mm and below in order to maintain 99% of peak intensity. In other words, an optical system having a large numerical aperture NA can be employed by reduction of the thickness of the substrate.

Influence of dust in recording-reproducing operation of an optical disc increases in proportion to the reduction of the thickness of the substrate of the optical disc, because the cross-section area of a laser beam on the surface of the substrate decreases in proportion to the reduction of the thickness of the substrate. The dust problem in the optical disc recording-reproducing operation is described in "System coding parameters, mechanics and electro-mechanics of the reflective video disc player", (IEEE Trans. on Consumer Electronics, page 309–317, and FIG. 19, November 1976). According to this paper, when the thickness t1 is 0.6 mm or more, influence of dust can be ignored with respect to dust having a diameter of 75 $\mu$m and below. Moreover, when the thickness t1 is 0.3 mm, the influence of dust can be ignored with respect to dust having a diameter of 20 $\mu$m and below. Since the optical disc is enclosed in the cartridge 1, dust having 20 $\mu$m of diameter can not be entered into the cartridge 1. Therefore, the substrate of 0.3 mm thick is usable in the recording-reproducing apparatus.

Furthermore, in the optical disc having a thin substrate such as 0.3 or 0.6 mm thick, the optical recording-reproducing operation is preferable to the magneto-optical recording-reproducing operation, because rotation of mere 0.2 degree of the plane of polarization must be detected in the magneto-optical recording-reproducing operation. On the contrary, in the optical recording-reproducing operation, the reproducing operation can be performed by detecting variation of reflection index by 20–30%.

The recording capacity of the optical disc depends on the numerical aperture NA as shown in equation (2). In the embodiment of the present invention, since the thin substrate such as 0.6 mm thick is used, the numerical aperture NA is increased. A resolving power $\epsilon$ is inversely proportional to a numerical aperture NA as well known to those having skill in the art. Thus, the resolving power $\epsilon$ decreases by increase of the numerical aperture NA. In other words, a recording area occupied by one bit is reduced in inverse proportion to the square of an increase ratio of the numerical aperture NA. An "increase ratio R" representing increase of a recording capacity caused by variation of the numerical aperture NA is represented by $$R=(NA2/NA1)^2 \quad (3),$$

where,

NA1: first numerical aperture,

NA2: second numerical aperture.

For example, the first numerical aperture NA1 is 0.53, and when the valve 0.53 of the first numerical aperture NA1 is increased to a value 0.65 of the second numerical aperture NA2, the increase ratio R is about 1.5 ($(0.65/0.53)^2$). Consequently, the recording capacity of the double recording optical disc 26 becomes three times (1.5×2=3) of that of the standard optical disc (384 MB, for example).

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alternations and modifications as fall within the true spirit and scope of the invention.

What is claimed is:

1. An optical disc recording-reproducing apparatus comprising:

laser light emitting means for emitting laser light, collimating means for collimating said laser light emitted by said laser light emitting means, focusing means for focusing said laser light collimated by said collimating means on a [recording] *information* area of a first optical disc having a first substrate of a first thickness (t1) and a first refractive index (n1) or a second optical disc having a second substrate of a second thickness (t2) and a second refractive index (n2), a beam splitter for separating laser light reflected from said [recording] *information* area of said first optical disc or said second optical disc, laser light sensing means for detecting laser light separated by said beam splitter, at least one optical plate for correcting aberration of said focusing means, having a thickness (t3) equal to a difference (n1*t1−n2*t2) between the product of said first refractive index (n1) multiplied by said first thickness (t1) and the product of said second refractive index (n2) multiplied by said second thickness (t2) divided by a refractive index (n3) of said optical plate, and actuator means for positioning said optical plate between said optical disc and said focusing means or for removing said optical plate therefrom.

2. An optical disc recording-reproducing apparatus in accordance with claim 1, wherein said optical disc is enclosed in a cartridge having at least one identification pit for identifying said optical disc enclosed in said cartridge, and said identifying pit being detected by a sensing means, the detected output of said sensing means being utilized to control said actuator means.

3. An optical disc recording-reproducing apparatus in accordance with claim 2, wherein said sensing means includes a light source and a light sensing element.

4. An optical disc comprising:

a first substrate of [at least] *a thickness of about* 0.6 mm [thick having a recording] *consisting essentially of a layer having a tracked surface and an information* layer on one side thereof, a second substrate of [at least] *a thickness of about* 0.6 mm [thick having a recording] *consisting essentially of a layer having a tracked surface and an information* layer on one side thereof, said second substrate being adhered to said first substrate with adhesive substance of at most 0.2 mm thick in a manner that the [recording] *information* layer of said second substrate is faced to the [recording] *information* layer of said first substrate, said adhesive forming a solid boundary between said first and second substrates.

*5. The optical disc of claim 4 wherein the recording or erasing of at least one of said information layers is effected by changing the phase of said information layer.*

*6. The optical disc of claim 5 wherein said information layers are erased by crystallization of said information layers.*

*7. An optical disc comprising:*

*first and second substrates of a thickness of about 0.6 mm, an adhesive substance of at most 0.2 mm thick interposed between said first and second substrates, said adhesive forming a solid boundary between said first and second substrates, at least one of said first and second substrates consisting essentially of a layer having a tracked surface and having an information layer on one side thereof, said one side of said substrate having said information layer facing said other substrate.*

*8. A process for recording to or reproducing from optical discs of different substrate thicknesses comprising:*

*emitting laser light,*

*collimating the emitted laser light,*

*focusing the collimated laser light on an information area of a first optical disc having a first substrate of a thickness (t1) and a first refractive index (n1) or a second optical disc having a second substrate thickness (t2) and a second refractive index (n2),*

*separating the laser light reflected from said information area of said first optical disc or said second optical disc,*

*detecting the separated laser light,*

*correcting aberration of a focusing means using an optical plate having a thickness (t3) equal to the difference (n1*t1−n2*t2) between the product of said first refractive index (n1) multiplied by said first thickness (t1) and the product of said second refractive index (n2) multiplied by said second thickness (t2) divided by a refractive index (n3) of said optical plate, and*

*positioning said optical plate between said optical disc and said focusing means.*

*9. An optical disc reproducing apparatus comprising:*

*laser light emitting means for emitting laser light,*

*collimating means for collimating said laser light emitted by said laser light emitting means,*

*focusing means for focusing said laser light collimated by said collimating means on an information area of a first optical disc having a first substrate of a thickness (t1) and a first refractive index (n1) or a second optical disc having a second substrate thickness (t2) and a second refractive index (n2),*

*a beam splitter for separating the laser light reflected from said information area of said first optical disc or said second optical disc,*

*laser light sensing means for detecting separated laser light,*

*at least one optical plate for correcting aberration of said focusing means using an optical plate having a thickness (t3) equal to the difference (n1*t1−n2*t2) between the product of said first refractive index (n1) multiplied by said first thickness (t1) and the product of said second refractive index (n2) multiplied by said second thickness (t2) divided by a refractive index (n3) of said optical plate, and*

*actuator means for positioning said optical plate between said optical disc and said focusing means or for removing said optical plate therefrom.*

*10. An optical disc comprising:*

*a first substrate of a thickness of about 0.6 mm consisting essentially of a layer having an indented surface and an information layer on one side thereof,*

*a second substrate of a thickness of about 0.6 mm consisting essentially of a layer having an indented surface and an information layer on one side thereof, said second substrate being adhered to said first substrate with adhesive substance of at most 0.2 mm thick in a manner that the information layer of said second*

*substrate is faced to the information layer of said first substrate, said adhesive forming a solid boundary between said first and second substrates.*

*11. An optical disc comprising:*

*a first substrate of a thickness of about 0.6 mm consisting essentially of a layer having a tracked surface and a reflective layer on one side thereof,*

*a second substrate of a thickness of about 0.6 mm consisting essentially of a layer having a tracked surface and a reflective layer on one side thereof, said second substrate being adhered to said first substrate with adhesive substance of at most 0.2 mm thick in a manner that the reflective layer of said second substrate is faced to the reflective layer of said first substrate, said adhesive forming a solid boundary between said first and second substrates.*

*12. An optical disc comprising:*

*a first substrate of a thickness of about 0.6 mm consisting essentially of a layer having an indented surface and a reflective layer on one side thereof,*

*a second substrate of a thickness of about 0.6 mm consisting essentially of a layer having an indented surface and a reflective layer on one side thereof, said second substrate being adhered to said first substrate with adhesive substance of at most 0.2 mm thick in a manner that the reflective layer of said second substrate is faced to the reflective layer of said first substrate, said adhesive forming a solid boundary between said first and second substrates.*

*13. An optical disc comprising:*

*first and second substrates of a thickness of about 0.6 mm, an adhesive substance of at most 0.2 mm thick interposed between said first and second substrates, said adhesive forming a solid boundary between said first and second substrates, at least one of said first and second substrates consisting essentially of a layer having an indented surface and having an information layer on one side thereof, said one side of said substrate having said information layer facing said other substrate.*

*14. An optical disc comprising:*

*first and second substrates of a thickness of about 0.6 mm, an adhesive substance of at most 0.2 mm thick interposed between said first and second substrates, said adhesive forming a solid boundary between said first and second substrates, at least one of said first and second substrates consisting essentially of a layer having a tracked surface and having a reflective layer on one side thereof, said one side of said substrate having said reflective layer facing said other substrate.*

*15. An optical disc comprising:*

*first and second substrates of a thickness of about 0.6 mm, an adhesive substance of at most 0.2 mm thick interposed between said first and second substrates, said adhesive forming a solid boundary between said first and second substrates, at least one of said first and second substrates consisting essentially of a layer having an indented surface and having a reflective layer on one side thereof, said one side of said substrate having said reflective layer facing said other substrate.*

*16. An optical disc comprising:*

*a first substrate of a thickness of about 0.6 mm consisting essentially of a layer having a tracked surface and an information layer on one side thereof,*

*a second substrate of a thickness of about 0.6 mm consisting essentially of a layer having a tracked surface and an information layer on one side thereof, said second substrate being adhered to said first substrate with adhesive substance of at most 0.2 mm thick in a manner that the information layer of said second substrate is faced to the information layer of said first substrate, wherein the information layer is a phase change material, said adhesive forming a solid boundary between said first and second substrates.*

*17. An optical disc comprising:*

*first and second substrates of a thickness of about 0.6 mm, an adhesive substance of at most 0.2 mm thick interposed between said first and second substrates, said adhesive forming a solid boundary between said first and second substrates, at least one of said first and second substrates consisting essentially of a layer having a tracked surface and having an information layer on one side thereof, said one side of said substrate having said information layer facing said other substrate, wherein the information layer is a phase change material.*

*18. An optical disc comprising:*

*a first substrate of a thickness of about 0.6 mm consisting essentially of a layer having an indented surface and an information layer on one side thereof,*

*a second substrate of a thickness of about 0.6 mm consisting essentially of a layer having an indented surface and an information layer on one side thereof, said second substrate being adhered to said first substrate with adhesive substance of at most 0.2 mm thick in a manner that the information layer of said second substrate is faced to the information layer of said first substrate, wherein the information layer is a phase change material, said adhesive forming a solid boundary between said first and second substrates.*

*19. An optical disc comprising:*

*first and second substrates of a thickness of about 0.6 mm, an adhesive substance of at most 0.2 mm thick interposed between said first and second substrates, said adhesive forming a solid boundary between said first and second substrates, at least one of said first and second substrates consisting essentially of a layer having an indented surface and having an information layer on one side thereof, said one side of said substrate having said information layer facing said other substrate, wherein the information layer is a phase change material.*

* * * * *